United States Patent
Nozari

[19]

[11] Patent Number: 5,818,192
[45] Date of Patent: Oct. 6, 1998

[54] STARTING OF SYNCHRONOUS MACHINE WITHOUT ROTOR POSITION OF SPEED MEASUREMENT

[75] Inventor: Farhad Nozari, Newcastle, Wash.

[73] Assignee: The Boeing Company, Seattle, Wash.

[21] Appl. No.: 511,173

[22] Filed: Aug. 4, 1995

[51] Int. Cl.[6] .................................................. H02P 1/46
[52] U.S. Cl. ...................... 318/609; 318/705; 318/717
[58] Field of Search .................................. 318/705, 709, 318/712–719, 723, 778, 779, 781, 798, 799–802, 807, 808, 606–619

[56] References Cited

U.S. PATENT DOCUMENTS

| | | | |
|---|---|---|---|
| 3,630,496 | 12/1971 | Hurst et al. | 261/26 |
| 3,845,372 | 10/1974 | Ringland et al. | 318/779 |
| 4,039,909 | 8/1977 | Baker | 318/732 |
| 4,321,478 | 3/1982 | Plunkett et al. | 307/47 |
| 4,361,791 | 11/1982 | Plunkett | 318/723 |
| 4,371,823 | 2/1983 | Lohest | 318/723 |
| 4,443,747 | 4/1984 | Chausse et al. | 318/723 |
| 4,463,295 | 7/1984 | Musil | 318/709 X |
| 4,683,411 | 7/1987 | Hamilton Jr. et al. | 318/706 |
| 4,804,900 | 2/1989 | Soeda | 318/719 |
| 4,949,021 | 8/1990 | Rozman et al. | 318/254 |
| 4,995,478 | 2/1991 | Oshima et al. | 187/115 |
| 5,029,263 | 7/1991 | Rozman | 318/714 |
| 5,083,905 | 1/1992 | Mohn | 417/45 |
| 5,164,651 | 11/1992 | Hu et al. | 318/778 |
| 5,315,225 | 5/1994 | Heinrich et al. | 318/714 X |
| 5,363,032 | 11/1994 | Hanson et al. | 318/721 |
| 5,386,186 | 1/1995 | Gritter | 318/798 |
| 5,585,709 | 12/1996 | Jansen et al. | 318/807 |

FOREIGN PATENT DOCUMENTS

| | | |
|---|---|---|
| 228525 | 7/1987 | European Pat. Off. . |
| 257628 | 3/1988 | European Pat. Off. . |

OTHER PUBLICATIONS

Patent Abstracts of Japan, vol. 8, No. 213 (E–269) [1650], Sep. 28, 1984 & JP–A–59 096888 (Toshiba K.K.) Jun. 4, 1984.

Patent Abstracts of Japan, vol. 10, No. 228 (E–426), Aug. 8, 1986 & JP–A–61 062387 (Toshiba Corp.), Mar. 31, 1986.

International Publication WO–A–95/17780, Wisconsin Alumni Research Fdtn., Jun. 29, 1995, p. 10, line 13; p. 11, line 10–27, figure 1.

*Primary Examiner*—Brain Sircus
*Attorney, Agent, or Firm*—Conrad O. Gardner

[57] ABSTRACT

A system for starting synchronous motor from a pulse-width-modulated static inverter without using rotor position or speed measurements. The system monitors supply current to the stator and derives a relationship between that current and the magnetizing flux. The system utilizes a narrowband filter that is tuned to pass only the motor currents fundamental component and whose tuned frequency changes with variations in motor speed. Furthermore, the system reduces the excitation provided to the motor after a certain value of line voltage is sensed.

3 Claims, 11 Drawing Sheets

BLOCK DIAGRAM OF ORIGINAL EQUATIONS SHOWING THEM TO EQUIVALENT TO AN OSCILLATOR

BLOCK DIAGRAM OF SYNCHRONOUS MACHINE EQUATIONS WITH ADDITION OF STABILIZATION LOOPS (IN DOTTED LINES)

STARTING OF SYNCHRONOUS MACHINE WITHOUT ROTOR POSITION OF SPEED MEASUREMENT

INTRODUCTION

The present invention relates to a system and method for starting a synchronous motor from a static inverter without reliance upon rotor position and speed measurements. The proposed system provides a method for performing a start of an auxiliary power unit (APU) for jet aircraft. Prior art includes the use of a DC motor to start the APU from a battery.

BACKGROUND ART

Exemplary of the prior art is U.S. Pat. No. 4,361,791 (Allan B. Plunkett) which describes an apparatus for controlling a permanent magnet synchronous motor driven by a pulse width modulated inverter. The method forms a modified flux vector by phase shifting the measured flux vector, and using this modified flux vector as a feedback signal for inverter control. Further exemplary of the prior art is U.S. Pat. No. 4,855,519 (Heinrich-Karl Vogelmann) which describes an apparatus for determining the flux vector of a machine without using a mechanical shaft position indicator. This is done by injecting a component of stator current from which the error between the computed flux vector and the actual flux vector can be calculated. The error is used to modify the computed flux vector. In contrast, the proposed system utilizes a flux estimation system using well known synchronous machine equations with feedback added to ensure stability of the estimated flux.

SUMMARY OF THE INVENTION

The proposed system utilizes a pulse-width-modulated static inverter to produce a controlled AC power to drive the generator of the APU as a synchronous motor for starting. An important feature of the present invention includes the method in which the output of the inverter is modified as the APU is started using only electrical system measurements. Rather than measuring the rotor speed and position directly in an attempt to optimize the starting torque, the supply current to the stator is measured, filtered and is used as a feedback to estimate the motor magnetizing flux. Then, by adjusting the supply voltage to hold the phase angle between the current and the estimated flux at the proper angle, the starting current can be optimized. An additional restriction is applied to avoid exceeding the maximum supply voltage.

BRIEF DESCRIPTION OF THE DRAWINGS

Further advantages and uses of the invention will become more apparent when considered in view of the following detailed description of a preferred embodiment of the invention when taken in conjunction with the accompanying drawings in which:

FIGS. 4A and 4B are block diagrams showing stabilization of flux estimation equations, FIG. 4A being illustrative of a block diagram of original equations showing them as equivalent to an oscillator while FIG. 4B shows a block diagram of flux estimation equations with addition of stabilization loops;

FIGS. 5 and 6 show the time history of the reference PMW voltage magnitude and the average PMW inverter output voltage magnitude while FIGS. 7 and 8 show the time history of the inverters reference and average current magnitudes;

FIG. 13 is the reference and input voltage to the PWM inverter, while FIG. 14 is the resulting inverter voltage. FIGS. 15 and 16 are the input and the output of the filter respectively;

DESCRIPTION OF THE PREFERRED EMBODIMENT

A. Introduction

The method described hereinafter relates to a system used to start a synchronous motor from a static inverter without relying on rotor position or speed measurements. Features of the control system used to govern this process are hereinafter described in detail. An overview of the system is provided in sections B.1 and B.2, followed by details of the individual functional blocks in sections C.1 through C.8. Section D describes a computer simulation of the synchronous motor starting scheme and verifies the proper operation.

B.1 System Overview

Figure 1:
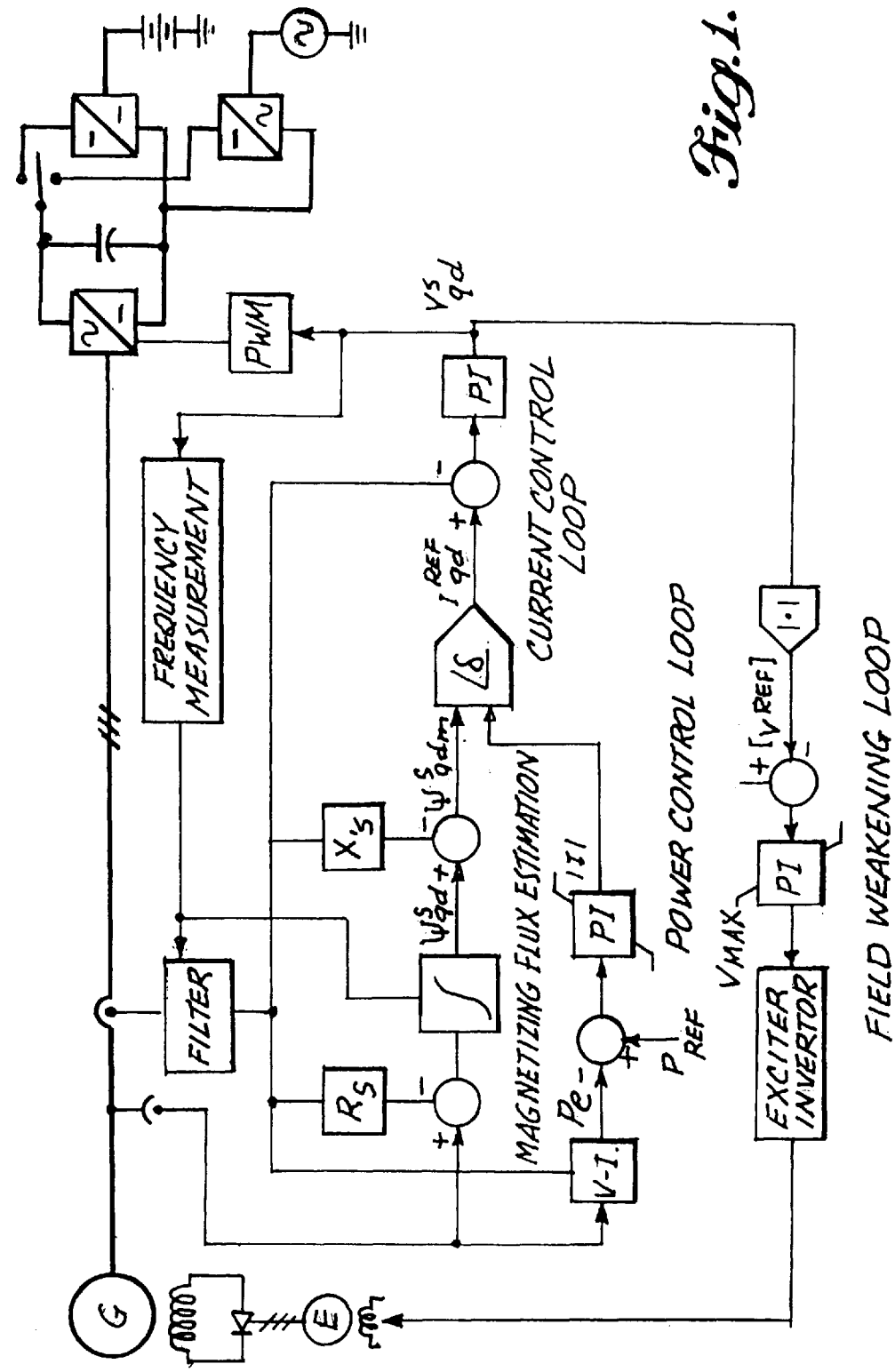
FIG. 1 is a schematic block diagram of a preferred embodiment of the present synchronous motor drive system.

FIG. 1 shows the components of the present synchronous motor drive system. Power to the synchronous motor is provided by a three-phase, variable voltage and variable frequency pulse-width-modulated (PWM) static inverter. Applicability to other forms of static inverter, e.g. six or twelve step inverters is expected although not studied and described hereinafter. The inverter provides AC power to the motor; the inverter's output voltage magnitude, frequency and phase being determined by the control system. Motor excitation is provided by a separate power source to establish field poles in the machine. Hereinafter follows a detailed description of the control system shown in FIG. 1. This provides control of the PWM inverter.

B.2 Control System Description

Figure 2:
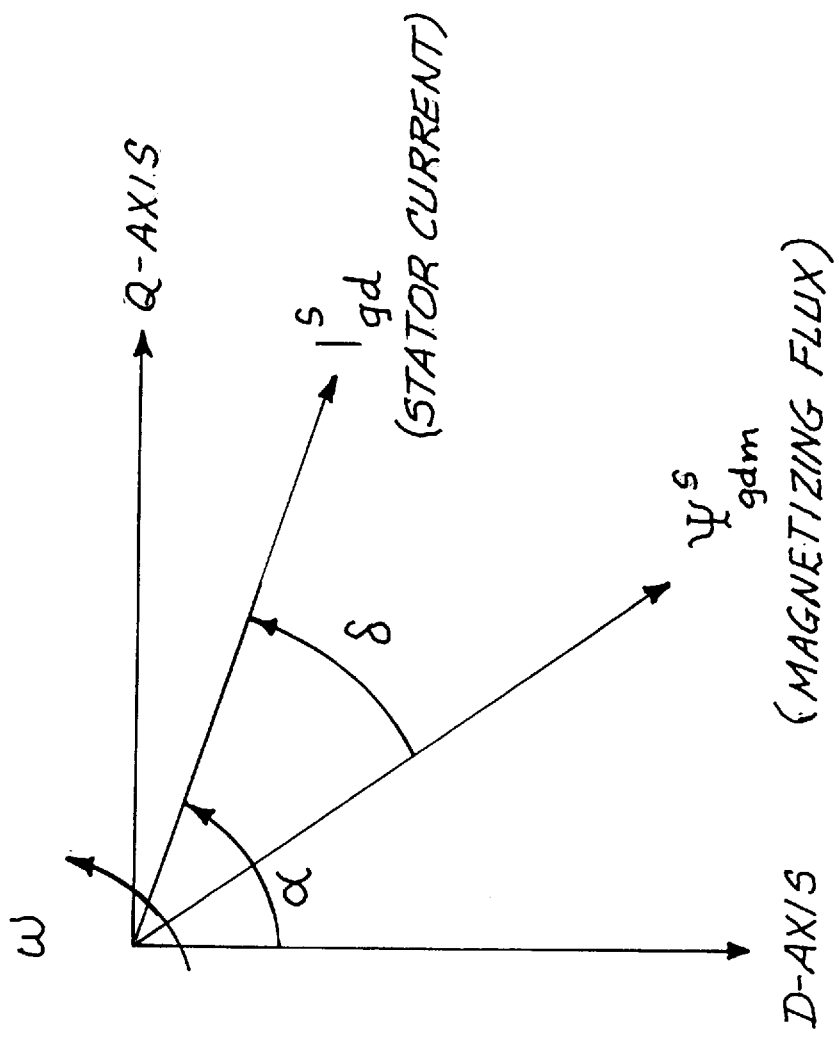
FIG. 2 is a diagram illustrative of the desired phase angle for controlling and optimizing developed torque.

In order to maximize the motor torque per armature ampere of the synchronous machine it is necessary to control the phasor relationships within the machine. The phasors of primary importance are the airgap magnetizing flux, $\Psi_{qdm}^s$, and the stator current, $I_{qd}^s$ both represented in a stationary reference frame. By maintaining a desired phase angle between these phasors, the developed torque can be controlled and optimized. For a round-rotor synchronous machine the optimum phase angle is 90 electrical degrees, that is, to have the stator current in the rotor reference frame, $I_{qd}^r$, entirely in the q-axis. However, for a salient pole synchronous machine the optimum phase angle depends on whether the machine is saturated or not. For the unsaturated condition, the optimum angle, $\delta$, is somewhat less than 90 electrical degrees, and is given by $$\delta = \alpha - \tan^{-1} \frac{X_{mq} I_{qs}^r}{X_{md}(I_{qs}^r + I_f)}$$

where the angle $\alpha$ is determined by solving equation below and is the angle between $I_{qd}^s$ and the d-axis as shown in FIG. 2.

$$(X_{md} - X_{mq}) I_{qd}^{s2} \cos 2\alpha + X_{md} I_{qd}^s I_f \cos \alpha = 0$$

For a saturated salient pole synchronous machine, on the other hand, the optimum angle is somewhat greater than 90 degrees, and is given by $$\delta = \alpha - \tan^{-1} \frac{X_{mq} I_{qs}^r}{E_i}$$

where $E_i$ is the machine internal voltage and the angle $\alpha$ is determined by solving the following equation $$E_i \cos \alpha - X_{mq} I_{qd}^{s2} \cos 2\alpha = 0$$

The control system will command the static inverter to maintain a phase angle near the optimum angular displacement by injecting the appropriate current $I_{qd}^s$ into the motor.

The phase angle of the current vector, $I_{qd}^s$, is established in relation to the estimated airgap magnetizing flux, $\Psi_{qdm}^s$, developed by the "Magnetizing Flux Estimation" portion of FIG. 1.

The magnitude of the current vector is determined by measuring the power being provided to the machine and comparing this to a reference power input. This function is provided in the "Power Control Loop". The calculated current magnitude is then combined with the current phase angle to provide a current reference signal $I_{qd}^{ref}$ as an input to the "Current Control Loop". This loop then provides a reference voltage, $V_{qd}^{ref}$, for the PWM inverter so that the inverter's output current matches the reference value of $I_{qd}^{ref}$. As the speed of the motor increases, the counter-voltage developed by the motor requires that the inverter's output voltage increase in order to maintain the desired reference current, $I_{qd}^{ref}$. At a certain speed this counter-voltage may exceed the voltage ability of the inverter. This would cause the inverter to lose the capability to control the motor in the desired fashion. To avoid this loss of control, the excitation to the motor is reduced after a certain value of line voltage is sensed. This decrease in motor excitation reduces the motor's counter-voltage allowing the inverter to retain control of the motor start at high speeds. The decrease in motor excitation is accomplished by the "Field Weakening Loop".

Sections C.1 through C.8 provide more detailed data on the individual blocks of the system schematic of FIG. 1.

C.1 Magnetizing Flux Estimation

One of the most important functions of the control system is to determine the magnitude and angle of the vector $\Psi_{qdm}^s$. This function is accomplished within the "Magnetizing Flux Estimation" block.

Determination of $\Psi_{qdm}^s$ is accomplished by manipulation of the following well known synchronous machine equations in a stationary reference frame (p denotes differentiation, d/dt):

$$V_{qs}^s = R_s I_{qs}^s + \frac{1}{\omega_b} p\Psi_{qs}^s$$

$$V_{ds}^s = R_s I_{ds}^s + \frac{1}{\omega_b} p\Psi_{ds}^s$$

$$\Psi_{mq}^s = \Psi_{qs}^s - X_{ls} I_{qs}^s$$

$$\Psi_{md}^s = \Psi_{ds}^s - X_{ls} I_{ds}^s$$

$$\Psi_{qdm}^s = \sqrt{\Psi_{mq}^{s2} + \Psi_{md}^{s2}} \angle \left( \tan^{-1} \frac{\Psi_{md}^s}{\Psi_{mq}^s} \right)$$

Determination of the magnetizing flux in the fashion described is marginally stable and would often become unstable due to other system dynamics. A method to stabilize flux estimation is described in section C.4. In addition, the above equations require knowing the fundamental frequency current components $I_{qs}^s$ and $I_{ds}^s$ for determination of $\Psi_{qdm}^s$. Finding these current components is complicated by the fact that the actual current waveform contains a significant amount of harmonic components. Direct use of the actual current waveform without filtering the harmonics would result in degradation of system operation, since, the control system would then try to respond to the harmonic components in addition to the fundamental. Extraction of this fundamental component is accomplished by the current measurement filter.

C.2 Current Measurement Filter

As discussed above, the filtering of the motor input current is an important element. Inadequate filtering may result in unacceptable current control and PWM converter operation. This is somewhat contrary to what has been observed in typical drive system applications using induction meters in which the motor's armature series inductance provides sufficient filtering of harmonic currents. Synchronous motors of high rating do not have as high a series inductance to provide inherent filtering action. Consequently, the filter is necessary for acceptable operation. The filter must effectively attenuate high order harmonic currents without introducing significant phase lag in the measured armature fundamental frequency current. In order to eliminate the harmonic components from the control system, a narrowband filter tuned to the system fundamental frequency $\omega_r$ is used. The mathematical representation of this filter is:

$$\frac{I_{fund}}{I_{actual}} = \frac{2\zeta\omega_r s}{\omega_r^2 + 2\zeta\omega_r s + s^2}$$

This filter has a unity gain and zero phase shift at its tuned frequency $\omega_r$ and a sharply reduced gain at all other frequencies, hence, it would provide the desired filtering. Also note that since the system fundamental frequency changes with motor speed, the filter's tuned frequency must also change with motor speed. The filter's tuned frequency is determined by measuring the fundamental frequency of the supplied PWM voltage as described in section C.3. below.

C.3 Determination of Electrical Frequency of the Motor

Figure 3:
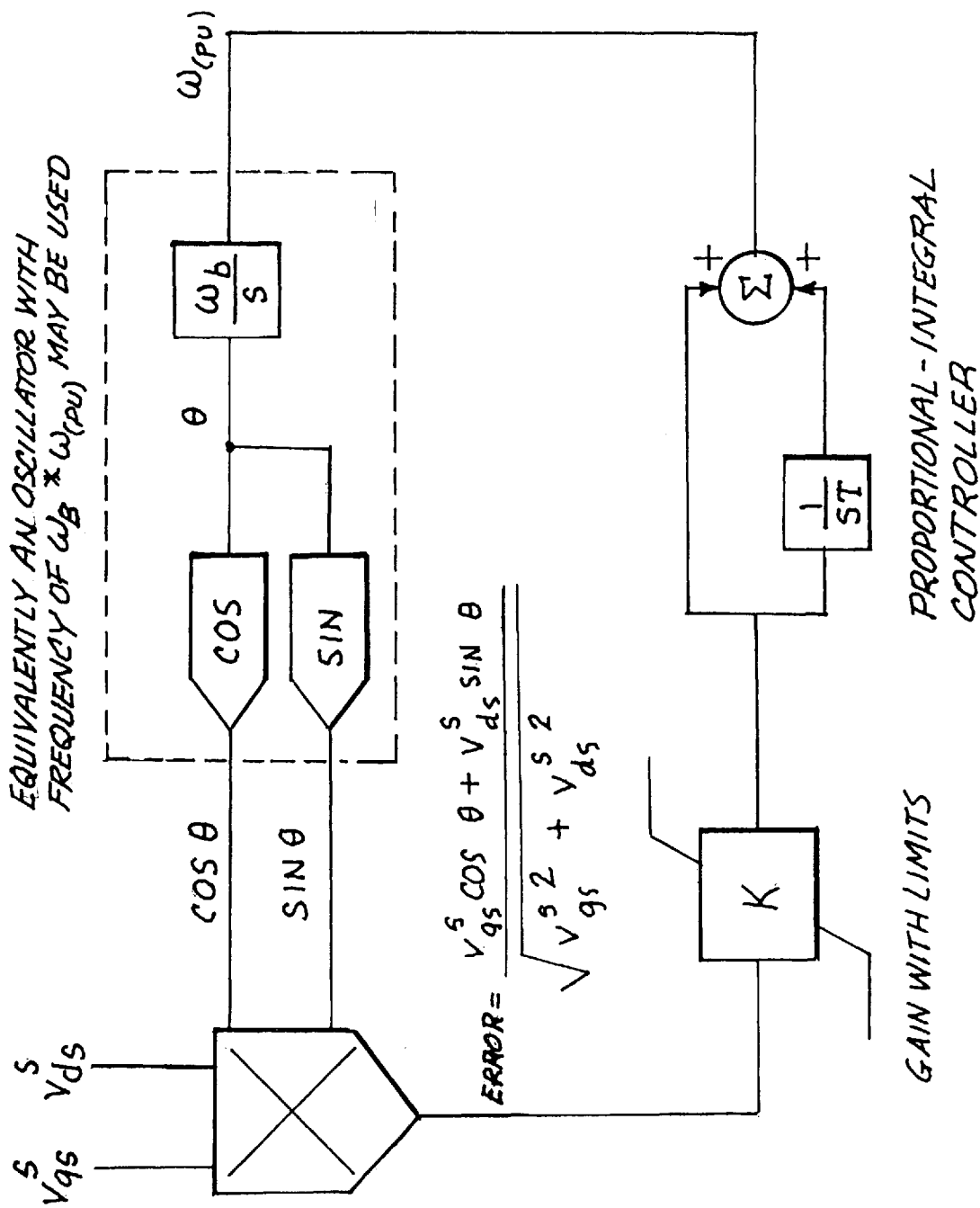
FIG. 3 is a block diagram showing signal processing for providing development of the motors electrical angular velocity ω using phase-locked loop with electrical angular velocity of the voltage output of the motor drive inverter.

As the above description indicates, determination of the motor's electrical angular velocity, $\omega_r$, is critical for operation of the control system. In the proposed scheme this is accomplished without sensing the motor's shaft speed. Instead it is determined mathematically using a well known phase-locked loop approach to measure the electrical angular velocity of the voltage output of the motor drive inverter. The block diagram is shown in FIG. 3. Signals proportional to $\cos\theta_r$ and $\sin\theta^r$, derived from the PWM reference voltages, are combined with $\cos\theta$ and $\sin\theta$ terms generated by a local phase-locked oscillator. This multiplication and subsequent subtraction results in a signal proportional to $\sin(\theta_r-\theta)$. If $\theta_r-\theta$ is very small, the $\sin(\theta_r-\theta)$ term represents a very slowly varying sine wave. Feeding this input to a proportional-integral controller results in a change in the controller's output, $\omega$ which is the frequency of the internal oscillator, until $\theta_r-\theta$ becomes zero. At this point the $\sin(\theta_r-\theta)$ term equals zero, and the integrator's output remains locked onto $\omega_r$ (=$d\theta_r/dt$). This measurement approach is accurate when the value of a $\omega$ being reasonably close to $\omega_r$ so that the argument of the sine term is small. Otherwise, the $\sin(\theta_r-\theta)$ may become oscillatory and the error that this term represents may not be decreased by the rest of the loop to zero. In the motor start system described herein we know that initially $\omega_r=0$. This may be used to initialize the internal oscillator (i.e., $\omega(0)=0$). Afterward, it would track the electrical angular velocity continually as the machine speeds up.

The measured $\omega$ is used as an input to the harmonic filter and flux estimator.

C.4 Stabilization of the Flux Estimation Loop

As was mentioned in section C.1, the flux estimation loop is marginally stable and would often become unstable due to other system dynamics. In order to see this marginal stability, it is instructive to transform the flux equations to the rotor reference frame as follows (p denotes differentiation, d/dt):

$$\frac{1}{\omega_b} p\Psi^r_{qs} = V^r_{qs} - R_s I^r_{qs} - \left(\frac{\omega_r}{\omega_b}\right)\Psi^r_{ds}$$

$$\frac{1}{\omega_b} p\Psi^r_{ds} = V^r_{ds} - R_s I^r_{ds} + \left(\frac{\omega_r}{\omega_b}\right)\Psi^r_{qs}$$

The fact that the eigenvalues (poles) of these equations lie on the imaginary axis means that the system is marginally stable. Other system dynamics may push these poles to the right-half plane thus making the overall system unstable. It would be desirable to move these poles into the left half plane to stabilize these equations without impacting the steady state and low frequency values of flux vector components $\Psi^r_{qs}$ and $\Psi^r_{ds}$.

Figure 4A:
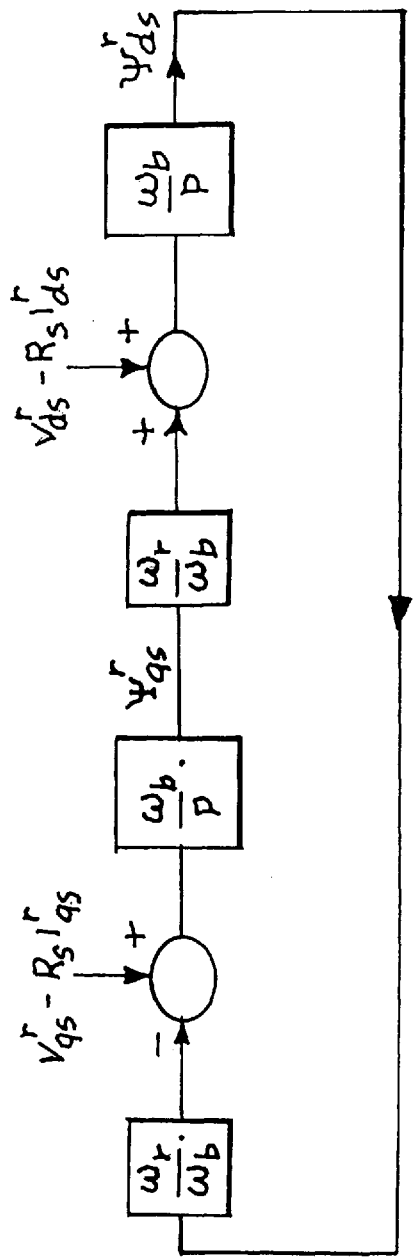
Figure 4B:
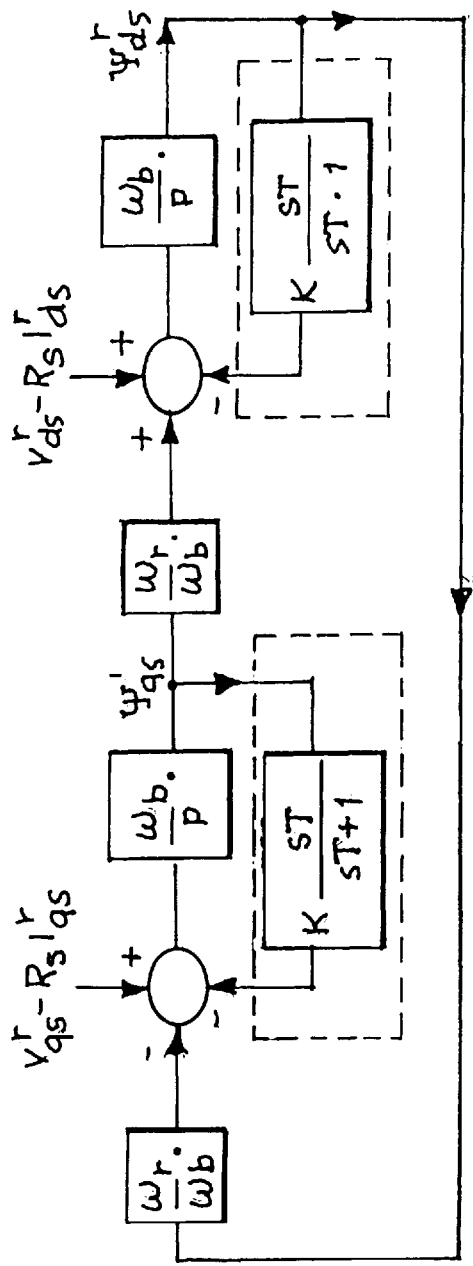

To solve this instability problem, feedback loops of washout form have been included in the flux estimation portion. These feedback loops are shown in FIG. 4 and result in movement of the poles to the left half plane. This shift in the poles causes damping of high frequency transient components, but it does not impact the steady-state and low frequency response of the flux estimator. The steady-state value of the flux estimator will continue to show the correct value.

Note that the feedback loops, in their simplest form in the rotor reference frame shown in FIG. 4, may be implemented in any reference frame. However, they must be implemented in the stationary reference frame to eliminate the need for rotor position information. The stabilized flux estimator equations in the stationary reference frames are then:

$$\frac{1}{\omega_b} p\Psi^s_{qs} = V^s_{qs} - R_s I^s_{qs} - K\frac{\omega_r}{\omega_b}(\Psi^s_{qs} - \sigma^s_{qs})$$

$$\frac{1}{\omega_b} p\Psi^s_{ds} = V^s_{ds} - R_s I^s_{ds} - K\frac{\omega_r}{\omega_b}(\Psi^s_{ds} - \sigma^s_{ds})$$

$$p\sigma^s_{qs} = \frac{1}{T}(\Psi^s_{qs} - \sigma^s_{qs}) + \omega_r\sigma^s_{ds}$$

$$p\sigma^s_{ds} = \frac{1}{T}(\Psi^s_{ds} - \sigma^s_{ds}) + \omega_r\sigma^s_{qs}$$

where K, T, $\sigma_{qs}^r$, and $\sigma_{ds}^r$ are the washout gain, time constant, q- and d-axis state variables, respectively, and the caret (^) denotes an estimated variable.

C.5 Current Control Loop

Once the phase angle of $\hat{\Psi}_{qdm}^s$ is known the desired phase angle of the motor current, $I_{qd}^s$, can be calculated. To obtain maximum motor torque the angular position of $I_{qd}^{ref}$ must be set ahead of the position of $\hat{\Psi}_{qdm}^s$ by the angle $\delta$, which is determined as explained in Section B.2. This requires knowledge of the synchronous machine parameters, in particular, the field circuit resistance to determine the field current $I_f$ and the machine saturation condition. However, this mathematically elegant approach is impractical since the field circuit resistance could significantly change with temperature variations and the resulting field current and the machine saturation condition could dramatically change. Fortunately, the angle $\delta$ is reasonably close to 90 electrical degrees for realistic conditions and does not need to be determined precisely for near optimum operation. In practice, selecting a fixed value of $\delta$ between 70 and 110 degrees would result in an acceptable, near optimum performance. Note that for an unsaturated machine, a $\delta$ of more than 90 electrical degrees would not reinforce the magnetizing flux, while a $\delta$ less than 90 electrical degrees would reinforce the magnetizing flux and possibly cause saturation. These factors should be considered in selecting a fixed value of $\delta$.

C.6 Power Control Loop Function

As described before, the magnitude of the reference current, $I_{qd}^{ref}$, for current control is obtained via the power control loop. Instantaneous motor voltage and the fundamental component of motor current (obtained from the current filter described earlier) are multiplied to obtain instantaneous motor input power. This value of power, $P_e$, is compared to a given reference power, $P_{ref}$ and the resulting error would be processed by an appropriate controller involving low pass filtering and proportional-integral (PI) regulation to determine the magnitude for the reference current. This magnitude information is combined with the desired current phase angle to determine the reference current, $I_{qd}^{ref}$, for the current regulators. The reference current, $I_{qd}^{ref}$, is then compared with the filtered measured currents to form error signals which in turn drive the PI current regulator blocks to arrive at a reference value for the inverter output voltage, $V_{qd}^{ref}$. See FIG. 1. The $V_{qd}^{ref}$ is then converted to phase values $V_{abc}^{ref}$ which in turn are inputed to the PWM inverter for appropriate switching actions through triangularized pulse-width-modulation. The $V_{qd}^{ref}$ is also inputted to the frequency measurement block to determine the fundamental frequency of the inverter output voltage which is proportional to the motor speed.

C.7 Field Weakening Loop Function

In order to provide torque control of the synchronous machine at high speeds it is necessary that the inverter be able to inject the required current into the machine windings. As the machine speed increases, the internal voltage of the synchronous motor, caused by field excitation, also increases. This acts as a back-voltage to the PWM inverter. In order to counteract this back voltage, the voltage supplied by the inverter must increase as the motor speed increases. With a constant field excitation, a speed would eventually be reached at which the inverter would be unable to satisfy the commanded current loop unless some means were in place to reduce the internally generated synchronous machine voltage.

This means is provided by the field weakening loop. Initially the field current is maintained at a maximum possible value to give a strong rotor field and thus a high starting torque. The voltage commanded by the current control loop is sensed during the motor startup process. When this commanded voltage, $V_{qd}^{ref}$, exceeds a given reference value, $V_{max}$, the exciter current is reduced by the field weakening loop. This maintains the motor back-voltage constant as the motor speed increases during the start cycle. This excitation control will extend the speed range that the converter maintains control of the motor start.

C.8 System Startup

Unfortunately, since the flux estimator is itself a dynamic system, it takes some time (about six seconds for the example in Section D) to overcome initial transients and correctly estimate the machine fluxes. Therefore, early in the startup, another control means should be used to provide starting of the synchronous machine while the flux estimator is reaching the correct estimating condition. Afterward, the flux estimator can be engaged in the preferred startup mode to provide a near optimum startup characteristic as described previously.

The following early startup technique was found effective through computer simulation studies and laboratory tests. The technique is comprised of the following four steps:

1. Energize the synchronous machine's field circuit with a maximum possible field voltage while the stator winding is energized by a very low frequency voltage (about two hertz for the example) at a very small voltage magnitude determined by a current controller regulating the stator current to its maximum allowable level. The synchronous machine should start rotating at a speed corresponding to the supplied frequency as the machine's field flux increases.
2. After a couple of seconds, when the synchronous machine's field flux is nearly established, ramp-up the inverter output frequency at a fairly slow rate of a few hertz per second (four hertz per second for the example) to a suitable value (about 20 hertz for the example). The synchronous machine should follow this frequency ramp-up and continue rotating accordingly, in an open loop manner.
3. Allow a few seconds for such an open loop operation mode to provide enough time for the flux estimator to overcome startup transients and correctly estimate the machine fluxes.
4. Switch to the preferred startup mode using the flux estimator for near optimum start-up performance.

D. Simulation Results

A computer simulation of the system as described above was performed for starting an auxiliary power unit with a 90 kVA generator typically installed in mid to large size commercial transport jetliners. The results are shown in FIGS. 5 through 32.

Figure 5:
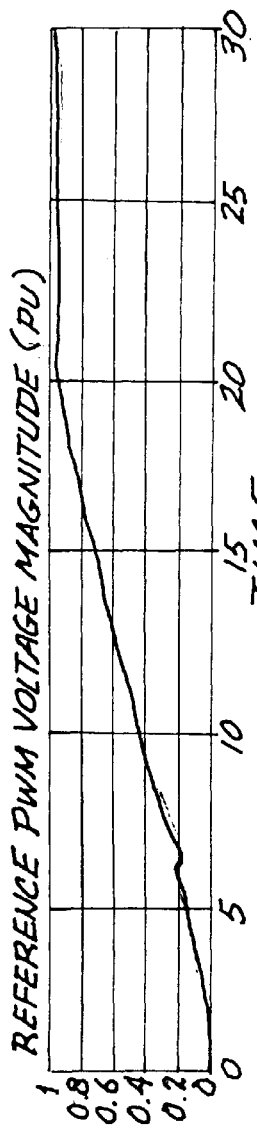
FIGS. 5 through 8 are graphs displaying voltage and current variables during initial starting of the synchronous machine, more specifically
Figure 6:
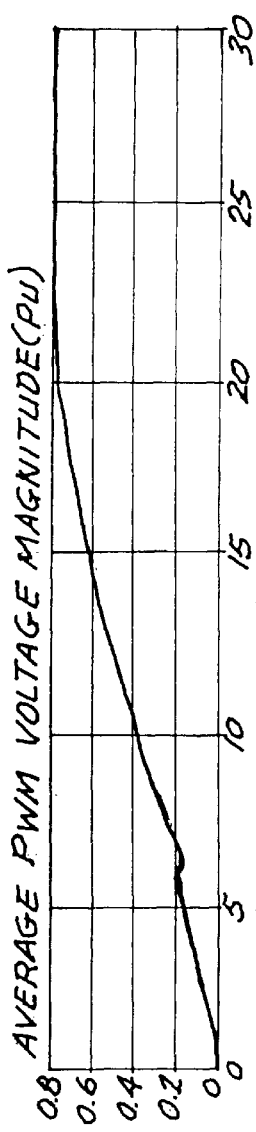

FIGS. 5 through 9 display voltage and current parameters during the initial starting of the synchronous machine. Note the discontinuities at about six seconds due to switching from early open loop start-up method to the preferred closed loop method. FIGS. 5 and 6 show the time history of the reference PWM voltage magnitude and the average PWM inverter output voltage magnitude. It can be seen that the magnitude of the required PWM voltage is small at the beginning of the APU start-up and rises gradually as the APU speeds up. While the voltage magnitude is less than the PWM maximum limit (that is the reference value of the Field Weakening Loop) the Field Weakening proportional-integral (PI) regulator is driven to its upper limit, hence the motor excitation is at its maximum allowable level (see FIG. 21).

Figure 7:
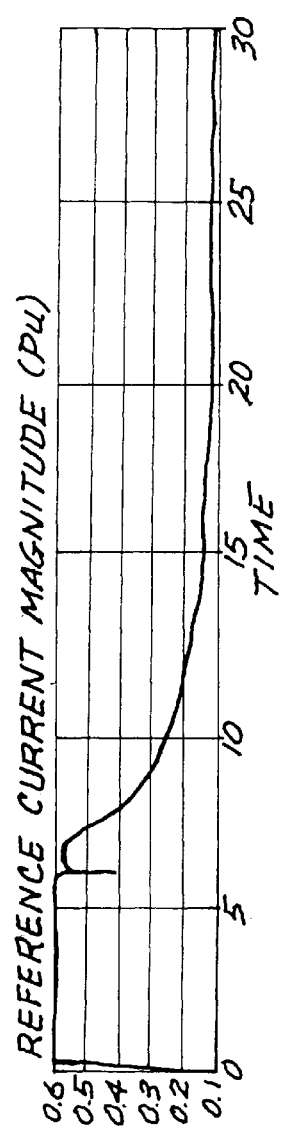
Figure 8:
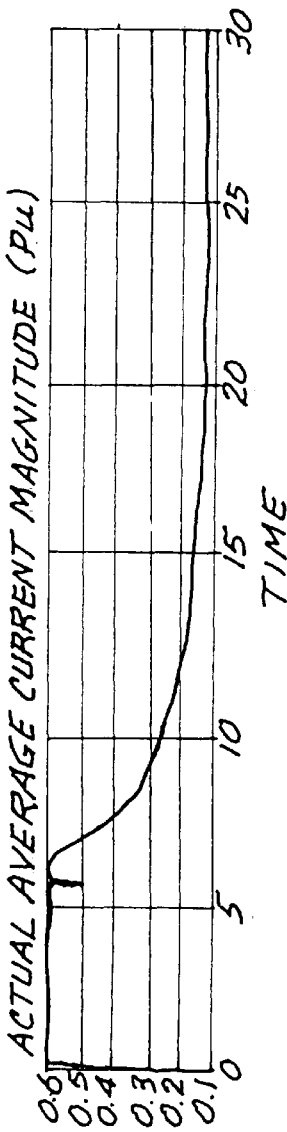
Figure 9:
FIG. 9 is a graph illustrative of motor drag torque.
Figure 10:
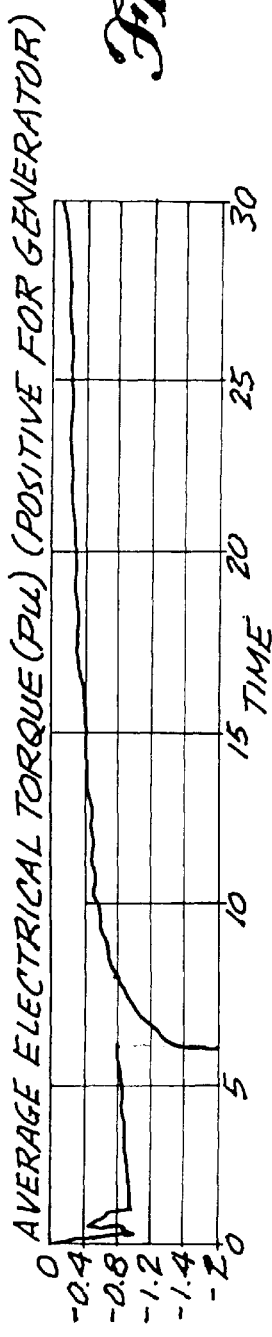
FIG. 10 is a graph plotting average electrical torque.
Figure 11:
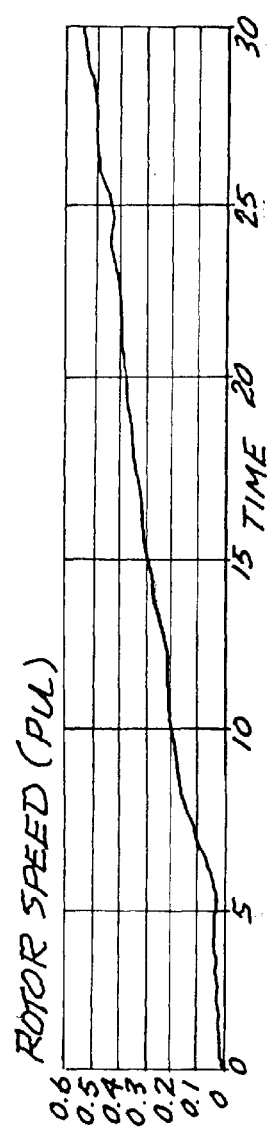
FIG. 11 is a graph showing rotor speed versus time.
Figure 12:
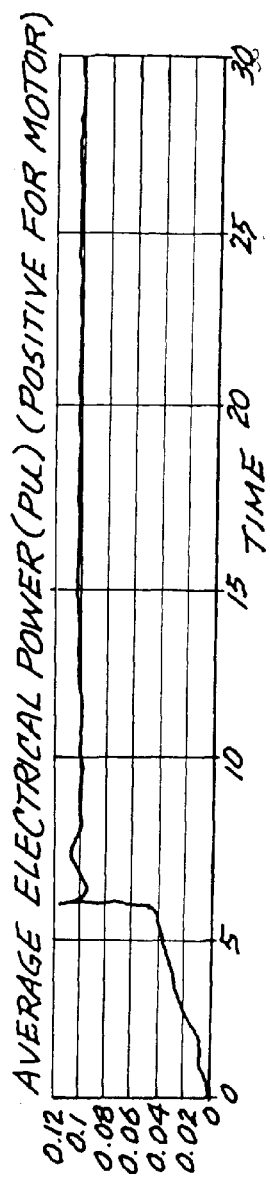
FIG. 12 is a graph showing average electrical power.

FIGS. 7 and 8 show the time history of the inverter's reference and average current magnitudes. It is noted that early in the start up the motor power is small due to its small speed, hence, the power controller PI regulator is driven to its upper limit resulting in the maximum allowable motor current. As the motor speeds up, the input power to the motor gradually rises. Upon switching from the early start-up method to the preferred start-up method, the motor input power suddenly increases to the desired vale of 0.1-per unit due to the increased motor torque (see FIG. 12). Thereafter, the PT regulator maintains the desired motor input power by reducing the motor current.

FIGS. 9 through 12 shows the drag torque and the average generator electrical torque during the start up, as well as the generator speed and electrical power. (The torque values in both these figures have a positive reference for generator produced torques and therefore have negative values for the motor that was simulated.) The electrical torque, during the early start-up, overcomes the drag torque, as well as resulting in a modest acceleration. During the preferred start-up method, however, the start-up torque is substantially higher, thereby resulting in an increased acceleration. As the power controller loop starts to reduce the generator armature current, the electrical torque is also reduced.

Figure 13:
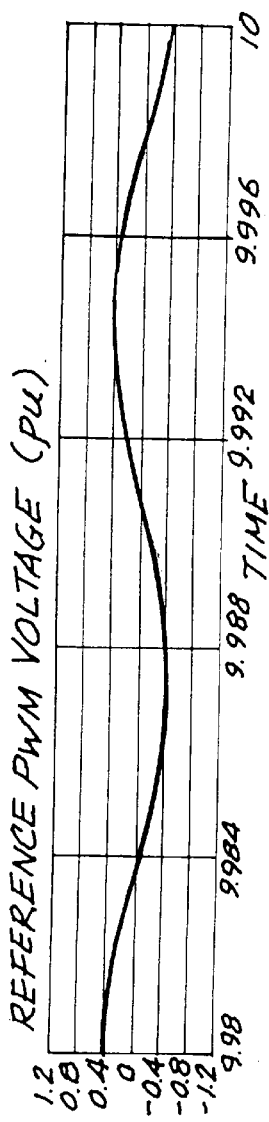
FIGS. 13 through 16 show the reference and the actual PWM voltages, as well as the actual and filtered synchronous machine armature currents at about 10-seconds into the machine's start-up, respectively.
Figure 14:
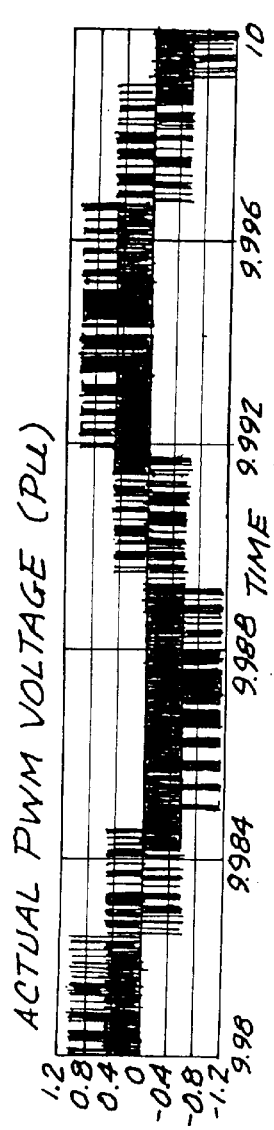
Figure 15:
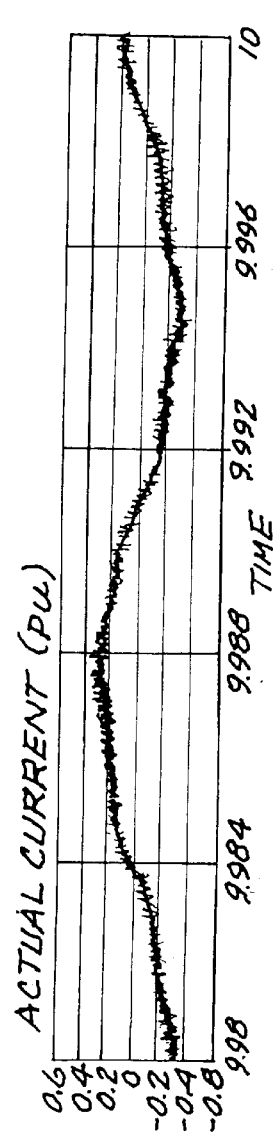
Figure 16:
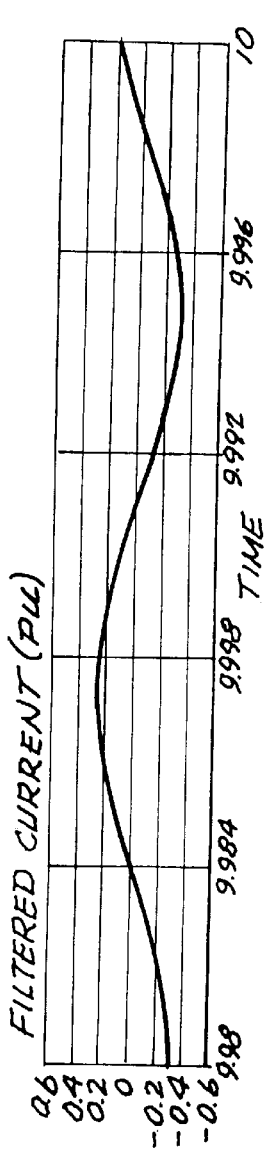
Figure 17:
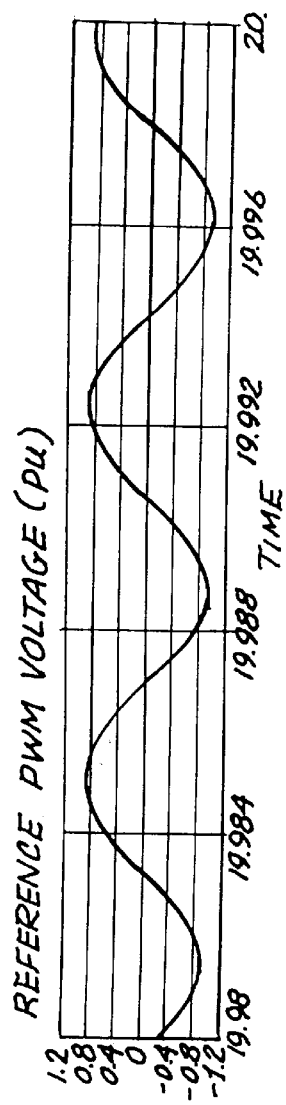
FIGS. 17 through 20 and 21 through 24 are similar to FIGS. 13 through 16, but at about 20 and 30 seconds into the machine's start-up, respectively.
Figure 18:
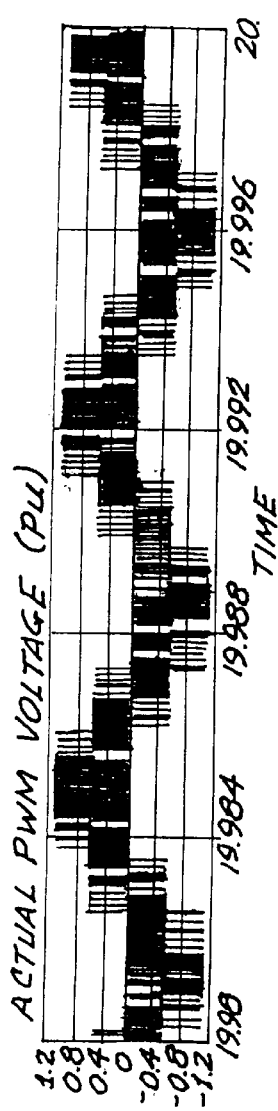
Figure 19:
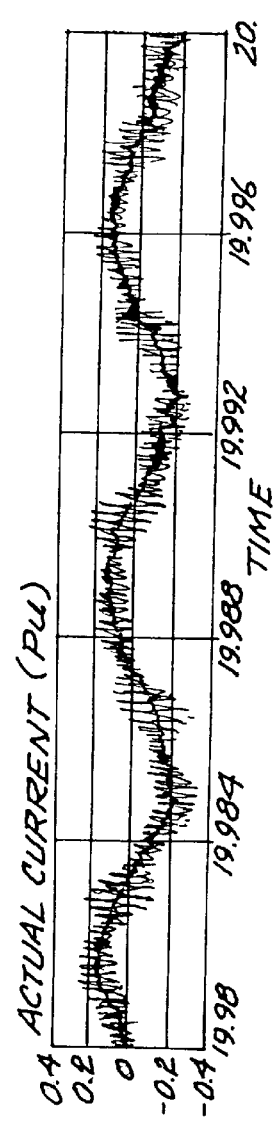
Figure 20:
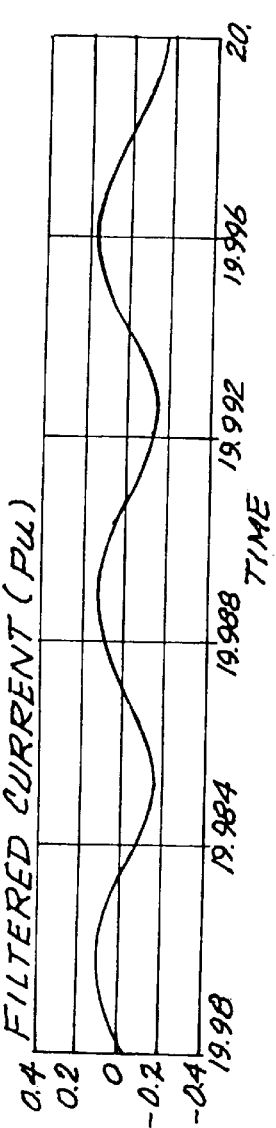
Figure 21:
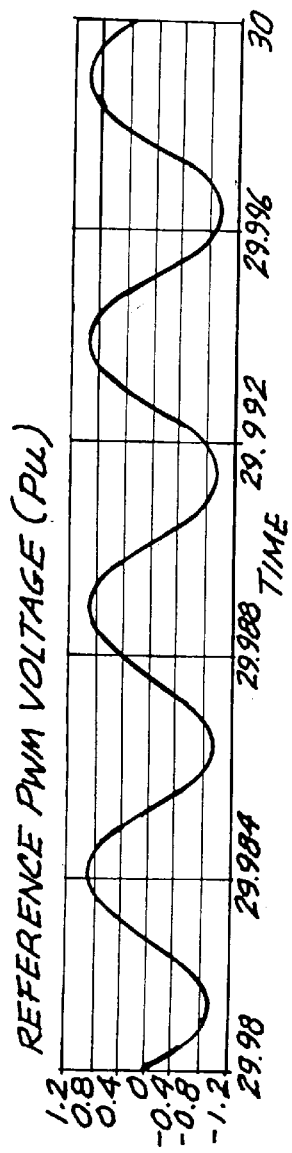
Figure 22:
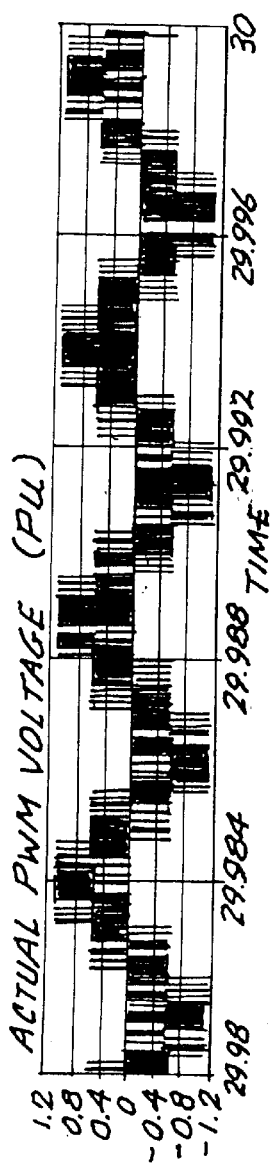
Figure 23:
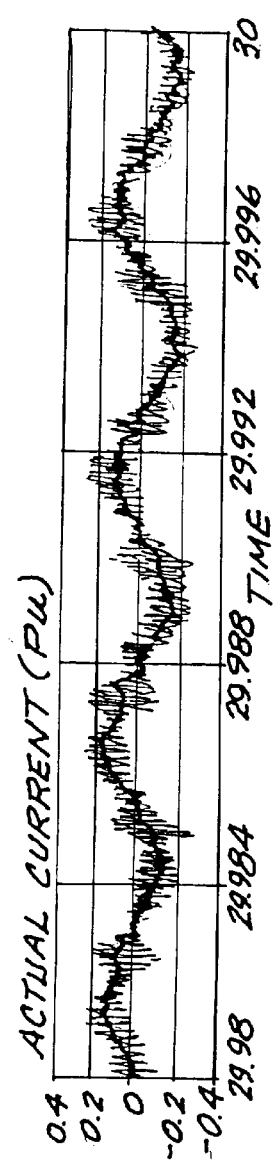
Figure 24:
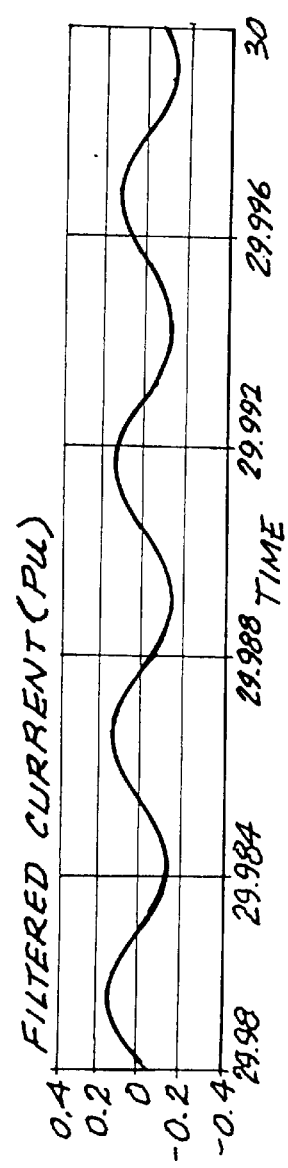
Figure 25:
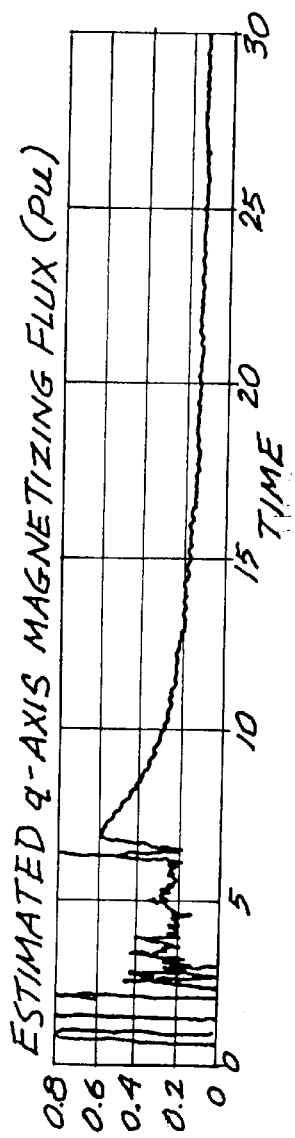
FIGS. 25 through 28 display the time history of the actual and estimated values of q- and d-axis magnetizing fluxes during the start-up; and, FIGS. 29 through 32 respectively show the time history of the field voltage, flux, and current in per-unit, as well as the inverter output power factor angle.
Figure 26:
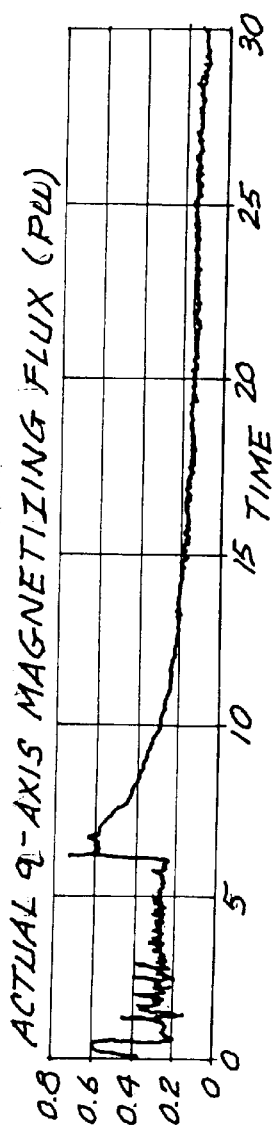
Figure 27:
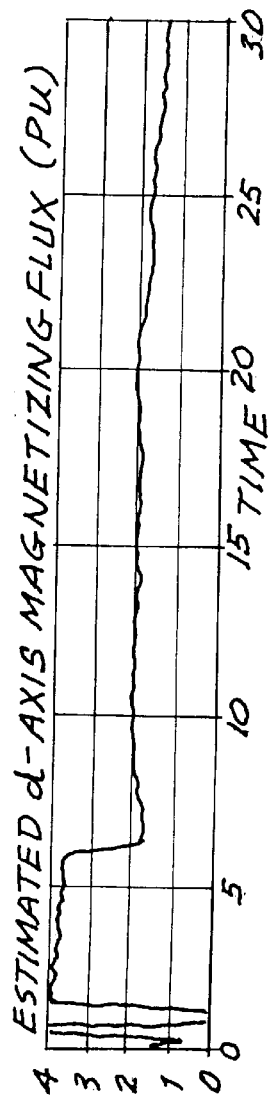
Figure 28:
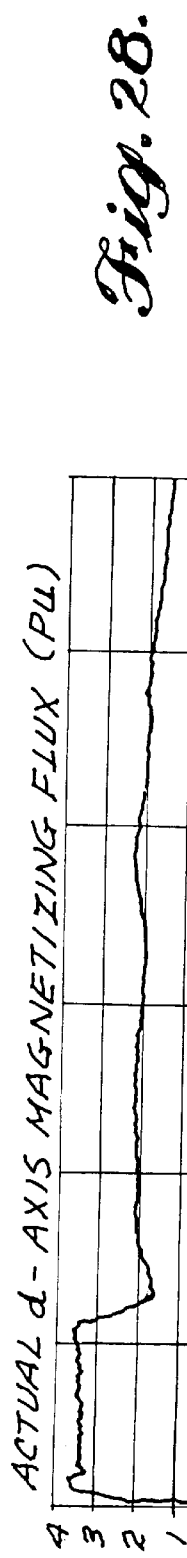
Figure 29:
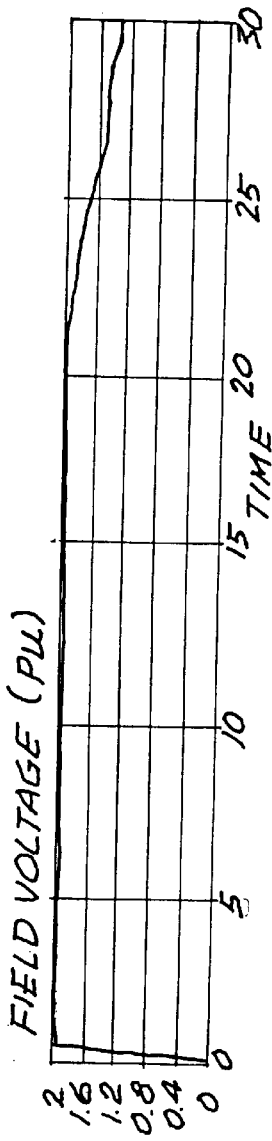
Figure 30:
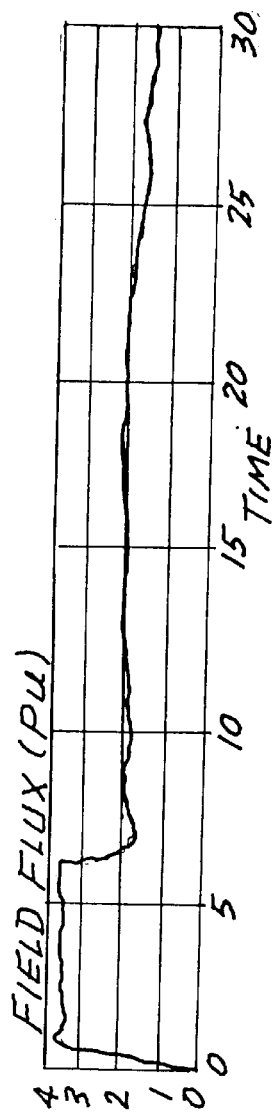
Figure 31:
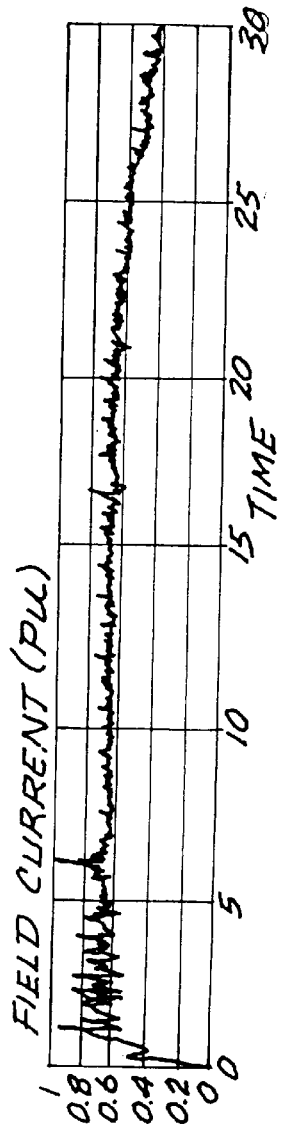
Figure 32:
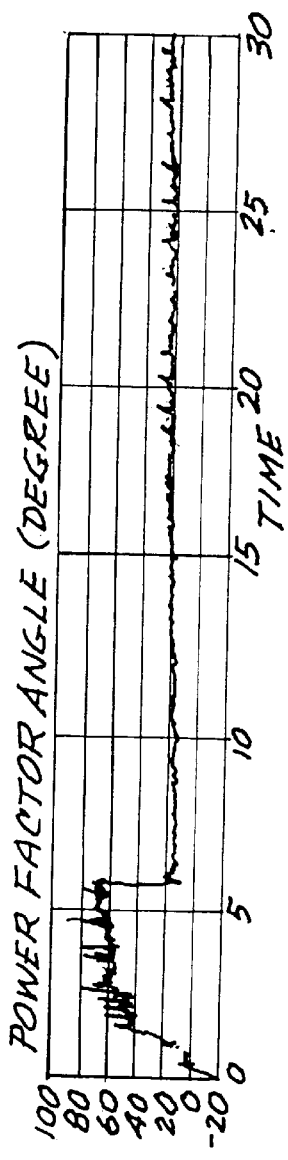

FIGS. 13 through 16 show the reference and the actual PWM voltages, as well as the actual and filtered synchronous machine armature currents at about 10-seconds into the machine's start-up, respectively. FIG. 13 is the reference input voltage to the PWM inverter, while FIG. 14 is the resulting inverter voltage. FIGS. 15 and 16 are the input and the output of the filter, respectively. FIGS. 17 through 20 and 21 through 24 are similar to FIGS. 13 through 16, but at about 20 and 30 seconds into the machine's start-up, respectively. As these figures indicate the filter performance is excellent. The filter eliminates undesirable harmonics without introducing any phase lag into the fundamental component.

Also note that as the motor speed increases, the field induced motor voltage increases. This requires that the PWM inverter reference and output voltages increase to maintain proper current regulation (See FIG. 5, as well as the PWM reference voltages in FIGS. 13, 17, and 21). As the PWM reference voltage approaches the PWM maximum limit, the field weakening loop reduces the generator excitation level. The inverter can then maintain control of the motor start as the speed continues to increase.

FIGS. 25 through 29 display the time history of the actual and estimated values of a q- and d-axis magnetizing fluxes during the start-up. The estimated values are obtained from the "Magnetizing Flux Estimation" block in FIG. 1. After attention of start-up translates in the flux estimator, which takes about five seconds, the estimated and actual magnetizing flux values are in close agreement. They continue to track each other throughout the rest of the motor start time period.

FIGS. 29 through 32 show the time history of the field voltage, flux and current in per-unit. The power factor input to the motor is also shown. The "Field Weakening Loop" is seen to take effect at approximately 21-seconds into the motor start. At this time the field voltage, flux, and current start to decrease as the motor speed increases.

The computer simulation verifies the proper operation of the generator/start motor drive system and its ability to quickly bring the APU to starting speed.

E. Hardware Verification of Synchronous Machine Startup Schemes

The synchronous machine starting method described herein has been implemented in hardware and further investigated to verify its operational features. The result indicated that the proposed method works as described, and is insensitive to parameter changes which typical synchronous machines can normally experience.

F. System Features Included

1. Filtering of Measured Motor Current As indicated in section C.2, one of the problems with control of a relatively large synchronous motor is that the machine doesn't provide enough inherent filtering of the motor's current. The machine current contains significant high frequency components in addition to the fundamental component. The high frequency components adversely affect control of the motor current. The hereinbefore described system utilizes a narrowband filter tuned to pass only the motor current's fundamental component and attenuates all other components. Since the motor speed changes with time, and fundamental frequency of the motor current is proportioned to speed, the filter's tuned frequency must change with motor speed. The motor's speed is indirectly measured using a phase-locked loop technique, this speed signal is then used to tune the filter. Use of such a filter to measure the synchronous machine's fundamental current is considered a significant feature.

2. Stabilization of the Inherently Unstable Flux Estimator A second unique feature of the present invention is the use of wash-out feedback to stabilize the inherently unstable flux estimator. The wash-out feedback stabilizes the flux estimator and allows it to operate during motor starting, as described in section C.1.

3. Elimination of the Need for Rotor Position The hereinbefore described system does not use mechanical rotor position sensing to determine spatial positioning of the various vectors. Instead, the method relies on the "Magnetizing Flux Estimation" block, and the "Frequency Measurement" block to obtain required information.

4. Use of Measured Frequency Instead of the Rotor Speed Frequency for control of the synchronous machine starting is obtained from the output voltage of the inverter and not from a mechanical measurement of the machine's shaft speed. This is a unique feature of the proposed synchronous machine startup method.

5. Use of the Field Weakening Loop In order to provide a limit for power output of the start inverter, the field of the synchronous machine is reduced at a set point in the start cycle. This addition of a field weakening loop during the synchronous machine startup is considered unique.

G. Abbreviations and Nomenclature

PI Proportional-plus-Integral Controller
PWM Pulse-Width-Modulation
$\Psi_{qdm}^s$ Phasor representing magnetizing flux linkage in stationery reference frame
$\Psi_{mq}^s$ q-axis component of magnetizing flux linkage in stationery reference frame
$\Psi_{md}^s$ d-axis component of magnetizing flux linkage in stationery reference frame
$\Psi_{qs}^r$ q-axis component of stator flux linkage in rotor reference frame
$\Psi_{qs}^r$ d-axis component of stator flux linkage in rotor reference frame
$\Psi_{qs}^s$ q-axis component of stator flux linkage in stationary reference frame
$\Psi_{ds}^s$ d-axis component of stator flux linkage in stationary reference frame
$I_{qd}^s$ Phasor representing stator current in stationary reference frame
$I_{qs}^s$ q-axis component of stator current $I_{qd}^s$ in stationary reference frame
$I_{ds}^s$ d-axis component of stator current $I_{qd}^s$ in stationary reference frame
$I_{qs}^r$ q-axis component of stator current $I_{qd}^s$ in rotor reference frame
$I_{ds}^r$ d-axis component of stator current $I_{qd}^s$ in rotor reference frame
$I_{qd}^{ref}$ Phasor representing the reference (desired) value of stator current in stationary reference frame
$V_{qd}^s$ Phasor representing stator voltage in the stationary reference frame
$V_{qs}^s$ q-axis component of stator voltage in stationary reference frame
$V_{ds}^s$ d-axis component of stator voltage in stationary reference frame
$V_{qs}^r$ q-axis component of stator voltage in rotor reference frame
$V_{ds}^r$ d-axis component of stator voltage in rotor reference frame
$R_s$ Stator resistance
$X_{ls}$ Stator leakage reactance
$X_{md}$ d-axis magnetizing reactance
$X_{mq}$ q-axis magnetizing reactance
$I_f$ Field current
s Laplace transform operator
$\zeta$ Filter damping ratio
$\theta_r$ Instantaneous electrical angle of rotor position
$\omega_r$ Electrical angular velocity of the rotor
$\theta$ Instantaneous phase angle of the phase-locked loop
$\omega$ Electrical angular velocity of the phase-locked loop
$\omega_b$ Base electrical angular velocity
$P_e$ Developed electromagnetic power
$P_{ref}$ Reference (desired) power
p Differential operator
^ Estimated variable indicator Different embodiments of the present invention may be developed without departing from the spirit and scope of the invention, the present preferred embodiment being merely illustrative of the present invention defined only in the appended claims.

What is claimed is:
1. A method for startup of a synchronous machine from zero speed comprising the steps of:

energizing the field circuit of said synchronous machine with a nominal field voltage while energizing the stator winding by a low frequency voltage having a magnitude determined by a current controller regulating the stator current to its maximum allowable level;

subsequent to a first predetermined time period during which the synchronous machine's field flux is established, ramping up the frequency of the stator voltage at a predetermined rate while the magnitude of the stator voltage is determined by the current controller regulating the stator current to its maximum allowable level; and then subsequent to a second predetermined time period during which a flux estimator overcomes initial transients, switching to a preferred startup method utilizing a flux estimator.

2. A method for developing the excitation of a synchronous machine field winding through a closed loop feedback controller comprising the steps of:

utilizing a proportional-integral controller to regulate the magnitude of the command voltage generated by a stator current controller to a maximum reference value for the command voltage while limiting the output of said proportional-integral controller to a value proportional to the maximum allowable voltage level for the synchronous machine field winding; and utilizing an exciter inverter to energize the synchronous machine field winding with a voltage proportional to the output of said proportional-integral controller.

3. A method for developing the magnitude of a synchronous machine stator current reference by utilizing a proportional-integral controller to regulate the input power to the synchronous machine, while the output of said proportional-integral controller is limited to a value proportional to the maximum allowable synchronous machine stator current.

* * * * *